Figure 1:
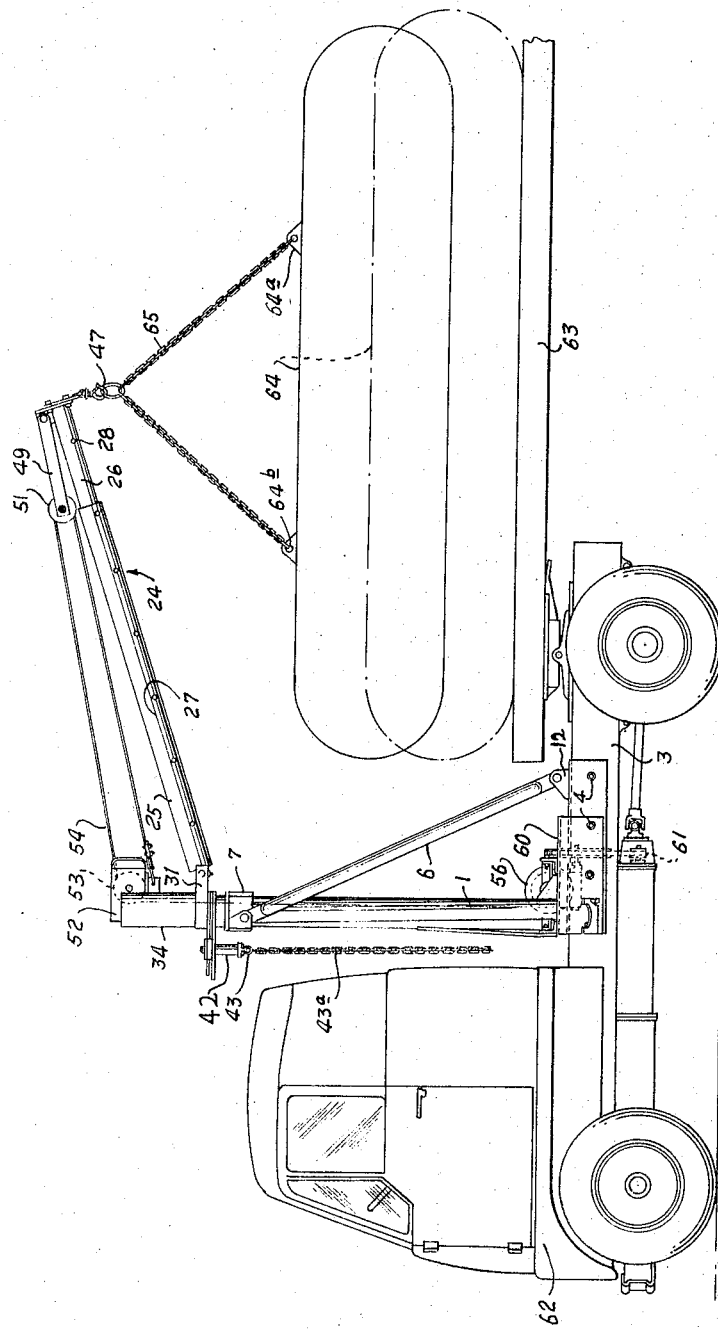

INVENTOR
Sam O. Weempe

BY Howard E. Moore
ATTORNEY

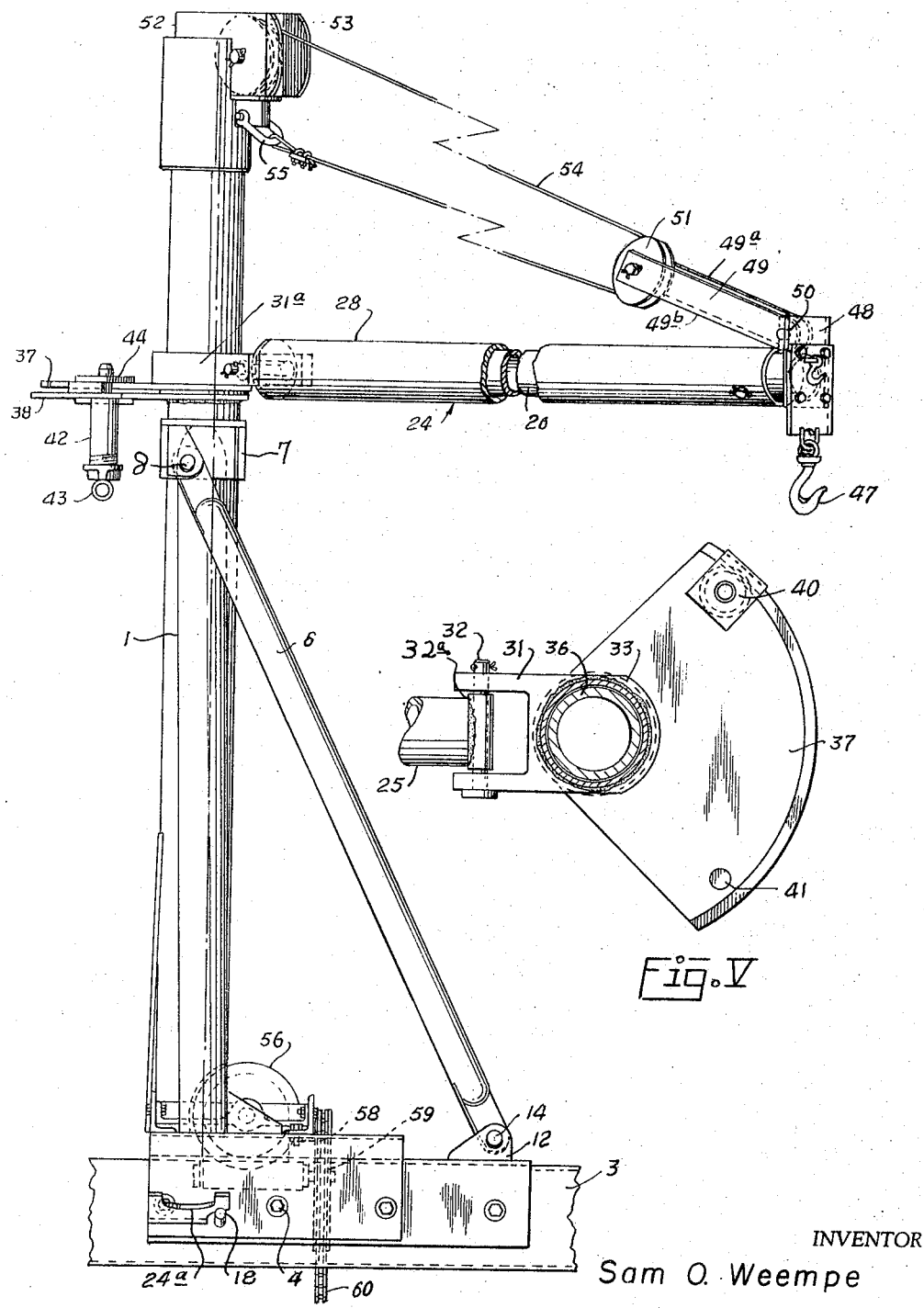

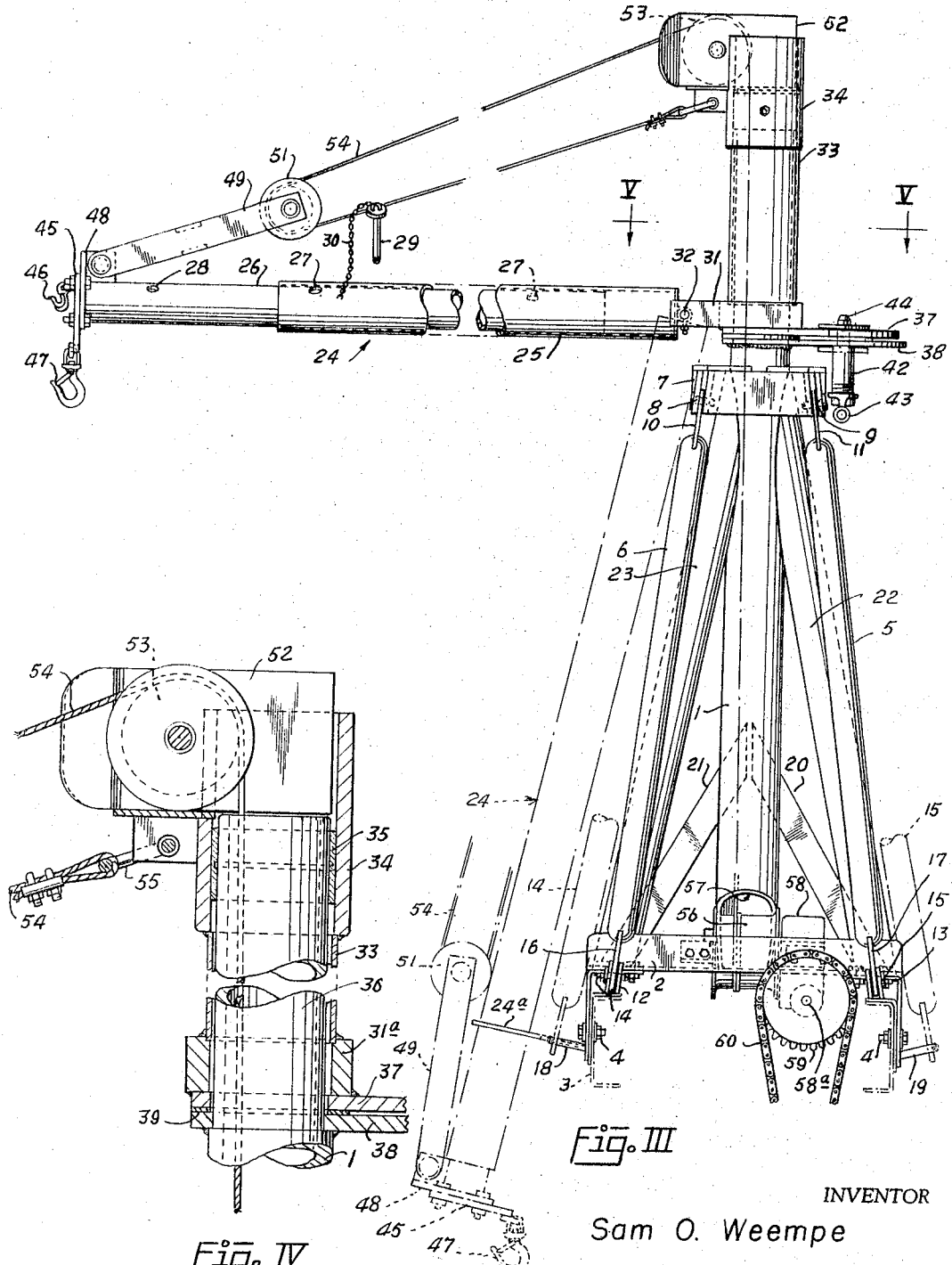

United States Patent Office 3,306,467
Patented Feb. 28, 1967

3,306,467
COLLAPSIBLE TRUCK MOUNTED HOIST
Sam Ollin Weempe, Dallas, Tex., assignor to Master Tank and Welding, Dallas, Tex., a partnership
Filed July 27, 1965, Ser. No. 475,153
6 Claims. (Cl. 212—55)

This invention is concerned with a hoist adapted to be mounted on a truck and is particularly concerned with a hoist which is arranged to be collapsed for storing in a compact position on the truck when not in use and which may be quickly extended when it is desired to use same.

It is, therefore, a primary object of the invention to provide a hoist mounted on the frame of a truck immediately behind the cab of the truck in position so that it can be employed and operated from the power take-off of the truck to load and unload heavy equipment on the truck bed, and which may be quickly and easily collapsed into a compact position so that it may be transported on the truck, out of the way of the trailer and articles carried by the truck, and may be quickly and easily unfolded and erected for use in unloading the articles hauled by the truck at the point of destination.

A still further object of the invention is to provide such a collapsible hoist, which is relatively simple and easy to operate, is economical to manufacture, and is versatile in its application.

Other and further objects of the invention will become apparent upon reading the detailed specification hereinafter following and by referring to the drawings annexed hereto.

A suitable embodiment of the invention is shown in the attached drawings wherein, FIGURE I is a side elevational view of a typical truck with the hoist mounted thereon, and showing it being employed to load tanks on a trailer attached to the truck;

FIGURE II is a side elevational view of the hoist in erected position;

FIGURE III is a front elevational view taken from the right side of FIGURE II, showing the hoist in erected position, and showing same in broken lines as it would appear in collapsed and folded position;

FIGURE IV is a fragmentary cross-sectional elevational view of the upper end of the central support post for the device; and FIGURE V is a transverse sectional view taken along the line V—V of FIGURE III.

Numeral references are employed to indicate the various parts shown in the drawings and like numerals indicate like parts throughout the various figures of the drawings.

A central tubular post 1 is secured to a base frame 2. The base frame 2 is secured to the truck frame 3 by suitable bolts 4. The post 3 is braced by the diagonal braces 20 and 21, which are secured at one end to the post and at the other end to the frame 2.

Detachable braces 5 and 6 are made of tubular material and are hingedly attached at their upper ends to the outward extending mounting bracket 7, which is secured to the post 1.

Flat end attachment members 10 and 11 are secured to the upper ends of the braces 5 and 6. The end members 10 and 11 have holes therethrough through which pass the pivot pins 8 and 9, which are secured to the mounting bracket 7. It will be noted that the end pieces 10 and 11 may slide laterally on the pins 8 and 9 in order to provide side play for the purposes hereinafter mentioned.

Upstanding mounting lugs 12 and 13 are secured to opposite sides of the frame 2. The mounting lugs 12 and 13 have holes therein adapted to receive withdrawable pins 14 and 15, which may be passed through coinciding holes in the end attachment members 16 and 17 secured to the lower ends of the braces 5 and 6.

The pins 14 and 15 may be withdrawn to detach the lower ends of the collapsible braces 5 and 6 so that they may be swung about on the pins 8 and 9 and the holes in the ends of the end attachment members 15 and 16 may be passed over the stowing pins 18 and 19, which are secured at each side of the frame 2.

The post 1 is also supported and braced by the outwardly extending diagonal braces 22 and 23, which are secured at the upper ends to the post 1 and at their lower ends to the frame 2.

A telescoping boom 24 includes an outer tubular member 25 in which is slidably disposed an inner tubular member 26.

A plurality of spaced adjustment holes 27 are provided in the wall of the outer member, which are arranged to be brought into alignment with spaced adjustment holes 28 through the wall of the inner member 26.

A withdrawable pin 29, which is attached to the outer member 25 by a chain 30 may be inserted through aligned adjustment holes 27 and 28 to secure the telescoping member 25, and 26 together in adjusted relationship.

A bifurcated attachment bracket 31 is secured to a collar 31a, which is rotatable about a bearing sleeve 36 secured to the upper end of the post 1.

A sleeve 32a is secured to the inner end of the boom member 25, and a securing pin 32 is passed through holes in the opposite sides of the bifurcated member 31 and through the sleeve 32a to provide a pivotal connection between the boom 25 and the bracket 31.

A sleeve 33 is secured to the collar 31a at its lower end and to the bearing sleeve 34 at its upper end.

Bearing bushings 35 are disposed between the outer wall of the bearing sleeve 36 and the bearing sleeve 34 is arranged to rotate about the bearing sleeve 36 on the bushings 35.

A bearing plate 37 is secured to the collar 31a, and a bearing plate 38 is secured to the post 1.

A bushing 39 is disposed about the bearing sleeve 36 between the bearing plates 37 and 38. The bearing plate 37 is arranged to rotate with reference to the bearing plate 38 on the bushing 39 as the boom 24 is swung about laterally in the manner hereinafter described.

Spaced holes 40 and 41 are provided through the bearing plates 37 and 38, which are arranged to be brought into alignment to lock the boom 24 in laterally rotated position.

A lock pin housing 42 is secured to the lower face of the bearing plate 38, and has a spring urged pin 44 arranged to pass through aligned holes 40 and 41 in the bearing plates 37 and 38 to lock same in laterally rotated position.

The pin 44 is spring urged outwardly of the housing 42, and may be withdrawn against a spring therein by pulling on the chain 43a, which is attached to an eye 43 secured to the lower end of the pin 44.

An end plate 45 is secured to the outer end of the inner telescoping member 26 of the boom 24. The handling hooks 46 and 47 are secured to the plate 45.

The pulley supporting arm 49, which comprises spaced side members 49a and 49b is pivotally mounted to a bracket 48 secured to the outer end of the inner telescoping member 26 of the boom 24 by means of a pivot pin 50.

A sheave or pulley 51 is rotatably attached between the side members 49a and 49b of the pulley mounting arm 49.

A birfucated bracket 52 is secured to the upper end of the rotatable bearing sleeve 34, and has a sheave or pulley 53 rotatably attached therebetween.

A wire rope 54 extends about the sheave 51 and is attached at its outer end to the clevis 55, which is hingedly attached to the lower end of the bracket 52.

A cable drum 56 is rotatably attached to the frame 2 at the lower end of the post 1. The cable 54 extends downwardly through the hollow post 1 and is wound about the cable drum 56.

The cable drum 56 is recessed in a cut-out portion 57 in the lower end of the post 1.

The cable drum 56 is rotatable through a gear box 58, which is driven through a drive sprocket 59 attached to the drive shaft 58a extending from the gear box 58.

The drive chain 60 extends about a power take-off 61, which is driven from the transmission of the truck through a suitable control, which may be located either in the cab or adjacent the collapsible hoist.

The operation and function of the device hereinbefore described is as follows:

It will be assumed that the device is erected and adjusted ready for use in picking up and loading articles, such as tanks 64, on the bed 63 of the truck 62. The boom 24 may be swung around to position to pick up the tanks for loading on the truck and the tanks may be attached thereto by means of a chain 65 extended about the hook 47 and attached at the outer ends to the eye 64a and 64b on the tank.

The boom may be lowered and raised by rotating the drum 56 thereby extending or taking up on wire rope 54. By releasing the pin 44 by pulling downwardly on the chain 43a, the boom 24 may be swung laterally to pick up articles to be loaded and to bring the tanks or other articles over the truck bed 63 where the boom 24 may be lowered by lifting the cable 54 by rotation of the cable drum 56.

After the tanks or other articles have been loaded on the truck, the hoist may be collapsed for transporting. This may be quickly and easily done by withdrawing the pins 14 and 15, swinging the arms 5 and 6, about and inserting them over the stowing pins 18 to thereby place them in alignment with the post 1.

The boom 24 may be collapsed, by withdrawing the pin 29 and sliding the boom member 26 inwardly of the outer boom member 25 by winding cable 54 in by rotation of the drum 56, and reinserting the pin 29 in aligned holes in such collapsed position.

The boom may then be swung about by rotating the plate 37 with relation to the plate 38 to a position where it may be pivoted downwardly into alignment with the post 1, as shown in broken lines in FIGURE III. The plates 37 and 38 may then be locked together by allowing the pin 44 to enter aligned holes 40 and 41 in such position.

It will be noted that the collapsed boom 24 rests within a semi-circular bracket 24a extending outwardly of the frame 2.

The device is thus retracted and stowed in compact position directly behind the truck cab, out of the way of the load, and may be quickly re-erected for use when it is desired to unload the tanks 64, or other articles or merchandise, hauled on the truck bed 63.

The device may be erected for use by reversing the procedure hereinbefore described.

It will be understood that other and further embodiments of my invention may be devised without departing from the spirit and scope of the appended claims.

Having described my invention I claim:

1. In collapsible boom adapted to be mounted on a truck having a frame with an operator's position and a load carrying portion thereon, a base frame attached to the truck frame between the operator's position and the load carrying portion; a vertical post attached to the base frame; a telescoping boom mounted on the post; means for rotatably mounting the boom with relation to the post; means for hingedly mounting the boom to the post for vertical movement with relation to the post, said boom being movable from a horizontally disposed position to a vertically disposed downward position; means for raising and lowering the boom; a pair of braces attached between the post and the base frame; means for hingedly attaching the braces at their upper ends to the post, said braces being movable about the hinged attachment means from a position extending longitudinally and rearwardly of the base frame to a declining position adjacent the post; and means for disengageably attaching the braces to the base frame at their lower ends, whereby the braces may be disengaged at their lower ends for movement inwardly to a position adjacent the post.

2. The combination called for in claim 1 with the addition of means carried by the base frame engageable with the lower ends of the braces to retain them in inward position when moved to a position adjacent the post.

3. The combination called for in claim 1 with the addition of means attached to the base frame engageable with the boom to support same when moved downwardly.

4. In a device of the class described, a supporting frame adapted to be attached to a truck frame; a tubular, vertically disposed, post secured to the supporting frame; a pair of diagonal braces; means for hingedly attaching the upper ends of the diagonal braces to the post; means for detachably mounting the lower ends of the braces to the frame in diagonally extended position, whereby they may be detached at their lower ends and moved inwardly to a position adjacent the post; means for detachably attaching the lower ends of the braces in such inward position; a boom rotatably and hingedly attached to the post, and being arranged to pivot from a vertically disposed position to a horizontally disposed position; said boom being comprised of a tubular member attached to the post and a telescoping member slidably disposed in the tubular member; means on the outer end of the telescoping member for attachment of an article to be moved by the boom; a pulley pivotally attached to the outer end of the telescoping member; a pulley rotatably attached to the upper end of the post above the point of attachment of the tubular member; a cable drum rotatably attached to the supporting frame at the lower end of the post; means for rotating the drum from a power take-off on the truck; and a line having an end attached to the upper end of the post and being extended about the first named pulley, the second named pulley, downwardly through the post and being wound about the drum, whereby by rotation of the drum the line may be taken up or let out to raise or lower the boom.

5. The combination called for in claim 4 wherein the pulley at the upper end of the post is attached to a common rotatable mounting with the tubular member whereby they will rotate together.

6. The combination called for in claim 4 with the addition of a rest member attached to the frame arranged to receive and stow the outer end of the boom when it is pivoted downwardly to a position adjacent the post.

References Cited by the Examiner

UNITED STATES PATENTS

| 1,254,804 | 1/1918 | Holmes | 212—59 X |
| 1,471,971 | 10/1923 | Miller | 212—55 |
| 2,804,979 | 9/1957 | Lassiter | 212—59 |
| 3,019,918 | 2/1962 | Keener | 212—59 X |

FOREIGN PATENTS 207,606  10/1955  Australia.

EVON C. BLUNK, *Primary Examiner.*

A. L. LEVINE, M. L. AJEMAN, *Assistant Examiners.*